United States Patent
Rogers et al.

(10) Patent No.: US 7,917,259 B2
(45) Date of Patent: *Mar. 29, 2011

(54) DISTRIBUTED VEHICLE SERVICE METHOD AND SYSTEM

(75) Inventors: Steven W. Rogers, Conway, AR (US); George M. Gill, Vilonia, AR (US); Jean De Bellefeuille, Harpswell, ME (US); Mike Kling, Little Rock, AR (US); Michael L. Baird, Morro Bay, CA (US)

(73) Assignee: Snap-On Technologies, Inc., Pleasant Prairie, WI (US)

( * ) Notice: Subject to any disclaimer, the term of this patent is extended or adjusted under 35 U.S.C. 154(b) by 1413 days.

This patent is subject to a terminal disclaimer.

(21) Appl. No.: 10/937,883

(22) Filed: Sep. 10, 2004

(65) Prior Publication Data

US 2005/0113991 A1    May 26, 2005

Related U.S. Application Data

(63) Continuation-in-part of application No. 10/066,795, filed on Feb. 6, 2002, now Pat. No. 6,859,699, which is a continuation-in-part of application No. 10/054,793, filed on Jan. 25, 2002, now Pat. No. 6,560,516, which is a continuation of application No. 08/962,023, filed on Oct. 31, 1997, now Pat. No. 6,405,111, which is a continuation-in-part of application No. 08/857,725, filed on May 16, 1997, now Pat. No. 6,285,932.

(51) Int. Cl.
*G06F 19/00* (2011.01)
*G06F 17/00* (2006.01)
(52) U.S. Cl. .................. 701/29; 701/32; 701/33; 701/35
(58) Field of Classification Search .................... 701/33, 701/29, 35, 31; 702/113; 33/203.18; 709/220, 709/221
See application file for complete search history.

(56) References Cited

U.S. PATENT DOCUMENTS 4,381,548 A    4/1983    Grossman et al.
(Continued)

FOREIGN PATENT DOCUMENTS

EP    1427165 A2    6/2004
(Continued)

OTHER PUBLICATIONS

Notice of Allowance from File Wrapper for U.S. Appl. No. 09/587,637 (corresponding to U.S. 6,556,904 B1) mailed on Nov. 28, 2002, including Examiner's Statement of Reasons for Allowance (6 pages).

(Continued)

*Primary Examiner* — Khoi Tran
*Assistant Examiner* — Jerrah Edwards
(74) *Attorney, Agent, or Firm* — McDermott Will & Emery LLP

(57) ABSTRACT

A method and system for conducting a vehicle service comprises the steps of receiving signals representative of vehicle parameters, accessing data and/or software necessary for performing the vehicle service from at least one remote computer over a data transmission network, and performing signal processing related to the vehicle service based on the signals representative of the vehicle parameters and the accessed data and/or software. Since the data and/or software necessary for conducting the vehicle diagnostic analysis is distributed in different systems that are connected via a data communication network, an automotive service system can minimize the size of software stored locally and can access most of the information and/or algorithm required for conducting the vehicle diagnostic analysis from a remote system.

4 Claims, 5 Drawing Sheets

U.S. PATENT DOCUMENTS

| | | | |
|---|---|---|---|
| 4,383,370 A | | 5/1983 | Van Blerk et al. |
| 4,404,639 A | | 9/1983 | McGuire et al. |
| 5,208,646 A | | 5/1993 | Rogers et al. |
| 5,506,772 A | | 4/1996 | Kubozono et al. |
| 5,732,074 A | * | 3/1998 | Spaur et al. .................. 370/313 |
| 5,909,581 A | * | 6/1999 | Park .............................. 717/170 |
| 6,205,473 B1 | * | 3/2001 | Thomasson et al. .......... 709/217 |
| 6,285,932 B1 | * | 9/2001 | de Bellefeuille et al. ....... 701/33 |
| 6,287,519 B1 | * | 9/2001 | Nordman et al. ................ 422/94 |
| 6,405,111 B2 | * | 6/2002 | Rogers et al. ................... 701/33 |
| 6,556,904 B1 | * | 4/2003 | Larson et al. ................... 701/33 |
| 6,560,516 B1 | * | 5/2003 | Baird et al. ..................... 701/23 |
| 6,859,699 B2 | * | 2/2005 | Carroll et al. ................... 701/33 |
| 2002/0029101 A1 | * | 3/2002 | Larson et al. ................... 701/33 |
| 2003/0097211 A1 | * | 5/2003 | Carroll et al. ................... 701/33 |
| 2004/0210362 A1 | * | 10/2004 | Larson et al. ................... 701/29 |
| 2005/0085964 A1 | * | 4/2005 | Knapp et al. ................... 701/33 |

FOREIGN PATENT DOCUMENTS

| | | |
|---|---|---|
| WO | WO 97/26750 | 7/1997 |

OTHER PUBLICATIONS

United States Code Title 35—Patents, Section 135 "Interferences", See Specifically: 35 U.S.C. § 135(b)(1).

Manual of Patent Examination Procedure Section 715.05 "U.S. Patent or Application Publication Claiming Same Invention" (3 pages).

Manual of Patent Examination Procedure Section 2100.06(d) "Information Relating to Claims From A Patent" (1 page).

Manual of Patent Examination Procedure Section 2307.05 "Corresponding Patent Claims Not Identified—2300 Interference Proceedings" (2 pages).

Consolidated Patent Rules—Subpart E—Patent Interferences, including 37 CFR 1.606 through 1.608, See Specifically: 37 CFR 1.607 ©, Jul. 1, 2000 edition.

Consolidated Patent Rules—Subpart E—Patent Interferences, including 37 CFR 41,200 through 41.208, See Specifically 41,201 "Threshold Issue" subsection (2)(i), and 41,202(b), effective Sep. 13, 2004.

* cited by examiner

INACTIVE MODEL

ACTIVE SERVER MODEL

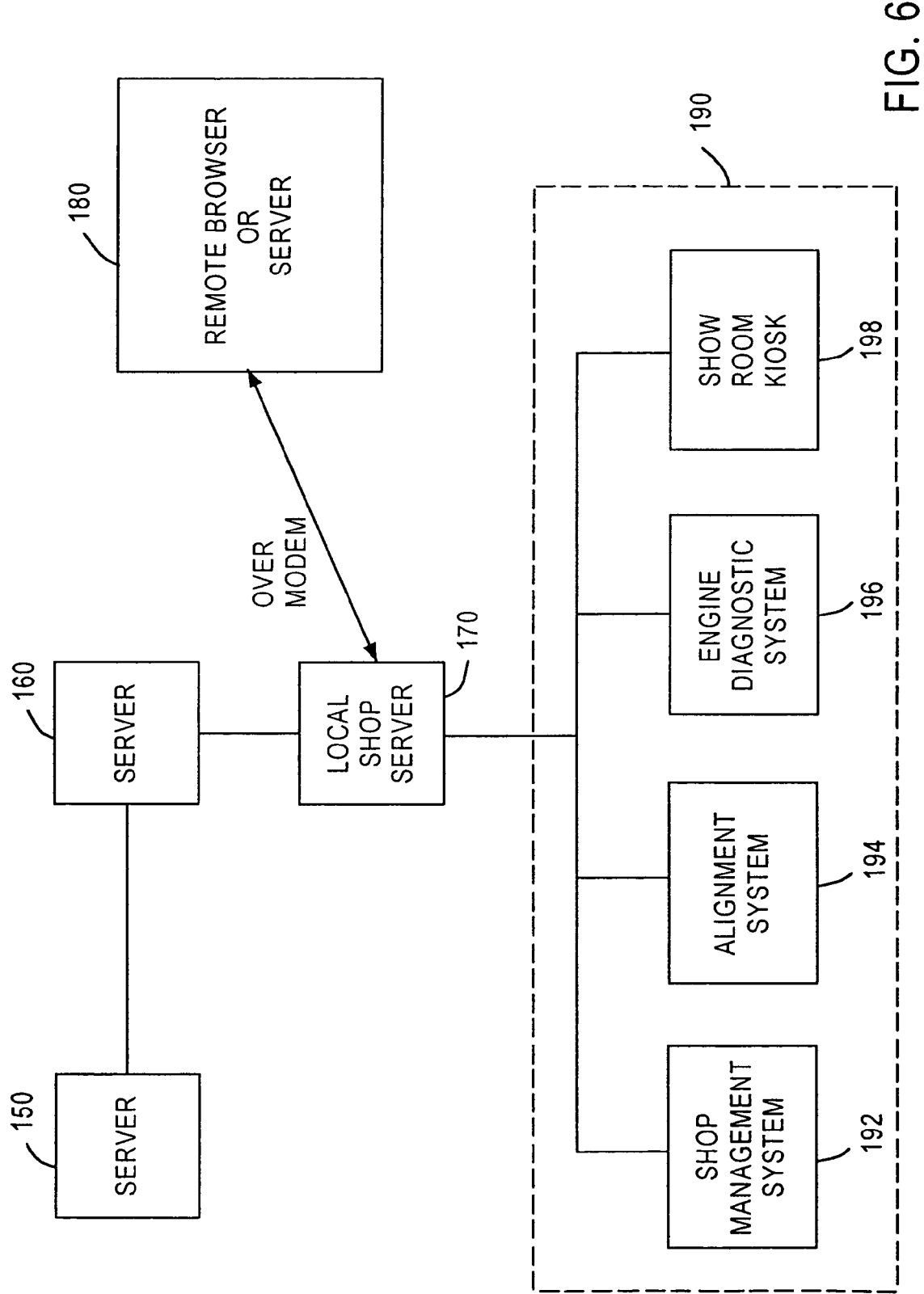

DISTRIBUTED VEHICLE SERVICE METHOD AND SYSTEM

RELATED APPLICATIONS

This application is a continuation-in-part of application Ser. No. 10/066,795, titled "NETWORK-BASED METHOD AND SYSTEM FOR DISTRIBUTING DATA," now issued as U.S. Pat. No. 6,859,699 and assigned to the assignee herein, which is a continuation-in-part of U.S. patent application Ser. No. 10/054,793, filed Jan. 25, 2002, now issued as U.S. Pat. No. 6,560,516 and assigned to the assignee herein, which is a continuation of patent application Ser. No. 08/962,023, filed Oct. 31, 1997, now issued as U.S. Pat. No. 6,405,111 and assigned to the assignee herein, which is a continuation-in-part of patent application Ser. No. 08/857,725, now issued as U.S. Pat. No. 6,285,932 and assigned to the assignee herein. All of the above-identified applications are incorporated herein by reference.

FIELD OF THE DISCLOSURE

The present disclosure relates to a distributed method and system for providing vehicle services, and more specifically, to a method and system for accessing data or software for conducting vehicle services from a remote data processing system using a network connection.

BACKGROUND OF THE DISCLOSURE

The modern automotive service bay contains numerous expensive pieces of equipment designed to automate servicing of an automobile. Wheel aligners, wheel balancers, engine analyzers, brake testers, hydraulic lifts, and similar devices typically contain microprocessors and/or computers to assist an automotive mechanic in performing various servicing tasks. Exemplary computerized automotive wheel alignment systems are disclosed in U.S. Pat. Nos. 4,383,370 and 5,208,646, whose teachings and disclosures are incorporated herein by reference.

Historically, such computerized automotive service equipment comprised proprietary, closed computer systems. A manufacturer of such systems would typically spend years developing software. The manufacturer had to customize the software to run on a single dedicated computer, and the resulting product had little or no flexibility to interchange and update different hardware and software elements. Each system ran different software, often on completely different operating systems designed for completely different hardware platforms. Each individual system also was incapable of being conveniently or easily updated. If a new development or improvement occurred, the manufacturer of the individual system typically had to issue an entirely new version release of the software and/or hardware in order to bring that improvement to market. The new release required a complete rewrite. Not only did new versions often take years to complete. It was also so costly to release a new system that, as a practical matter, the manufacturer would have to wait until enough improvements occurred in order to justify the financial burdens of a new version release. This hampered the ability of the end user, the automotive service professional, to bring the latest technological improvements to the customer, the typical car driver.

Furthermore, such prior art automotive service equipment systems were not generally designed to communicate or cooperate with other computers in the service bay and elsewhere. For instance, the wheel aligner computer did not communicate with the engine analyzer computer, and neither communicated with the accounting computer or the intake/reception area computer. One consequence of this is that customer or vehicle owner/identification information had to be entered repeatedly into each piece of automotive service equipment each time the same vehicle was serviced in different parts of the service bay. This redundancy wasted valuable operator time and promoted key-entry errors.

It has been known to design automotive service equipment that sends data through a local area network to a file server, such as a Novell server platform. This, however, limits the information to being stored as files and does not support real-time data flow or a distributed application. An example of such as system is disclosed in U.S. Pat. No. 4,404,639, dated Sep. 13, 1983. The data retained in such files could only be downloaded and stored on self-contained proprietary platforms. These data-only files, then, did not give the resulting automotive service equipment system the capability of exporting data to a remote location for processing, and then returning the processed data to the original location. They also did not give the resulting system the capability to locate different portions of a single automotive service equipment application on different computers.

The prior art automotive service equipment system computers also did not communicate with any remote off-site computer to submit in real-time the data gathered by the sensors in the course of effecting a service procedure. Hence, it was not possible for sensors to transmit their data in real-time to a remote site for analysis and inspection at that remote site. For instance, in vehicle wheel alignment applications, the wheel alignment sensors that were mounted on the vehicle wheels were capable of transmitting wheel angle data only to the vehicle wheel alignment machine itself. There was no way for an off-site technician and/or an off-site computer to review the data to evaluate whether the alignment angles were within specification. Likewise, there was no way for an on-site technician to present this real-time angle information to an off-site expert for purposes of either troubleshooting problems with the servicing equipment, or for receiving instructions and advice on how to proceed with an alignment procedure.

Moreover, for automotive service equipment that depended on OEM and manufacturer generated specifications, such as vehicle wheel alignment equipment, the danger of obsolescence presented itself every new model year. Isolated, dedicated systems required continual updating of vehicle specifications, usually via CD-ROM's. Managers of the service bay would have to maintain the most updated specifications available for their computerized automotive service equipment. Otherwise, the service bay might have to turn customers away, or worse, the attendants might service newer vehicles to erroneous specifications. The administrative task of maintaining updated specifications for the computerized equipment was an additional burden on the personnel running the service centers.

RELATED TECHNOLOGIES

Two major developments in the computer arts have heretofore not been applied in the field of automotive service equipment. The first of these is Internet-based technologies. The second is object oriented programming. Both will be discussed below in detail to lay the groundwork for the subsequent detailed description of the present disclosure.

Internet-Based Technologies

Until now, no known automotive service equipment utilized the data transfer capabilities of the Internet. The World Wide Web is one type of network residing on the Internet. It began as an information networking project at the European Laboratory for Particle Physics (CERN). The World Wide Web is best described as the specific software, protocols, conventions and information that enable hypertext and multimedia publishing of resources on different computers around the world. The popularity of the Internet has provided the computer software industry with many new software applications, yet these by and large have been restricted to home and entertainment use.

Web Browsers

Most commonly, home and entertainment users of the Internet access the Internet through the use of a World Wide Web browser. This Web browser application can easily and seamlessly display text and graphics sent from practically any type of computer system. The information to be displayed is sent to the Web browser on Web "pages." Web pages are constructed using the syntax and rules defined in the ISO 8879 Standard General Markup Language (SGML) document available from the W3 Consortium, a group of companies and individuals dedicated to the use and standardization of certain data transmission protocols. This ISO standard is sometimes known as hypertext markup language (HTML), version 3.2, although it has evolved that HTML is both slightly overinclusive and underinclusive of the actual ISO 8879 standard. HTML is a markup language used to create hypertext documents that are not unique to one platform or another. HTML files are ASCII text files with codes embedded (indicated by markup tags) to indicate formatting and hypertext links.

Web Servers

Computer systems that send information to a Web browser are called Web servers. A Web server stores Web pages (constructed and stored as static files) and serves them out to the Web browser on demand. In their simplest form, server Web pages that are constructed only with HTML, without more, cannot be changed by a Web browser user, and are thus not interactive.

Web Communication Protocols

Those of skill in the art will appreciate that the Web utilizes a number of communication protocols to transmit and receive addressable data. HTTP is an application-level protocol for distributed, collaborative, hypermedia information systems. It is a generic, stateless, object-oriented protocol. Web servers are computers equipped with the server software to respond to HTTP requests, such as requests from a Web browser. HTTP has generally subsumed most of the functions of the older File Transfer Protocol (FTP). FTP, in turn, is a protocol that requires a logon to a remote computer to browse directories and affect a two-way file transfer. A feature of the newer HTTP, which again has largely replaced FTP, is the typing and negotiation of data representation, allowing systems to be built independently of the data being transferred.

A Web server uses this HTTP protocol to communicate with clients on a TCP/IP network. TCP/IP is a lower level protocol that communicates with a network card driver. The network card driver in turn communicates directly with the network hardware or physical layer of the protocol stack. TCP/IP provides the source and destination address of the data. More specifically, TCP/IP is defined as a set of networking protocols that provides communications across interconnected networks of unlike computers. TCP/IP includes standards and conventions for routing data traffic. When a user at a browser submits a new request to access a Web page, one of the first things the browser does is to locate the TCP/IP address for that particular page. In principle, any computer having a TCP/IP address and properly connected to the Internet can be accessed on the Web.

By using a single Web browser application to access different Web "sites," or Web Servers, around the world, a user can see, hear and interact with many different informational systems. A user can experience information in different languages and presentation styles. A user can view pictures, movies, music, live telephone or video teleconferences, search databases, download software, control and view robotic video cameras, participate in group discussions, and send or receive email. A special new browser, called a thin client, can also run computer software that actually resides on another computer across the world. Such thin clients make it possible to lease software or run software that would not normally work on a particular type of computer, i.e., Windows programs on a Unix system. An example of a thin client is the Winframe Web Client by Citrix Systems, Inc., Coral Springs, Fla.

Common Gateway Interface (CGI)

At the Web server, oftentimes an application exists that receives data inputs from a Web browser, and then uses those inputs to dynamically assemble a particular output in return. The Web browser then displays the output to the browser operator. These applications are generally referred to as common gateway interfaces (CGI). A CGI script file is a program that executes on the Web server. A database search engine is a good example of a CGI script, as is a Web page counter that indicates the number of "hits," or visitors, to a Web page within a certain period. The user at the Browser is first presented with a form inquiring what type of information is to be extracted from the database. Once the user fills out the form and submits it by sending it back to the Web server, the CGI script is executed. The CGI uses the information from the form to compose a query to the database. The CGI script then formats the information retrieved from the database query and sends it back to the Web browser for display. A CGI script is limited, since it is basically a stand-alone program that executes outside the Web server. CGI scripts cannot access user information available from within the Web server, as they can usually only take an input directly from the form submitted by the user at the browser.

Other programs reside on the browser alone, or the browser and server both, to add to the functionality of the browser by making it dynamic and interactive with the Web server. Two examples are Java and ActiveX.

Java Technologies

Java, developed by Sun Microsystems, is a browser language that allows small programs or applications, called "applets," to run within the browser. Java script is sent from the Web server as byte codes. The Java byte codes are not HTML but are embedded within HTML. The Web browser contains a program called a Java Virtual Machine that converts the byte codes to computer instructions that are subsequently executed. Java is therefore computer type independent, and a Java applet will work on any Web browser supporting the Java Virtual Machine. Java is good for animated displays and moving or scrolling text messages, but is limited to only the functions provided by the Web browser. A Java applet cannot access functions outside the Web browser.

Component Object Model Technology

The Component Object Model (COM) is a software object model that has a standardized interface. COM objects can communicate with other COM objects over distributed computers via protocols such as DCOM, a Microsoft standard. The protocol is indifferent to the particular transmission medium used, i.e., LAN, Intranet, Internet, serial connection, et cetera.

ActiveX Technology, developed by Microsoft Corporation, is an implementation of a component object model. ActiveX is similar to CGI scripts and Java applets. ActiveX enables interactive and fully functional programs based on Web browser technology. ActiveX is made up of several components: ActiveX server extensions, server filters, Active server pages and ActiveX controls (formerly, OLE controls). ActiveX server extensions are similar to CGI scripts but actually execute as extensions of the Web server. Extensions have access to useful information, within the Web server, about the Web browser users and the Web server host system. ActiveX controls are analogous to Java applets. Examples include buttons, stock tickers and chart controls. However, unlike Java script, ActiveX controls are not byte codes but actual small computer programs, or software objects that do not require a subsystem such as the Java Virtual Machine. Active X controls are not computer type independent and must be written exclusively for a target computer type, e.g., a Windows-based system. Once installed into the Web browser, an ActiveX control is not limited to only the functions provided by the Web browser. Active X controls have the power to perform any function that any typical computer application can perform because they are stand alone software objects. For instance, they may be a stand alone word processor, spread sheet, etc. ActiveX controls also have the built-in capacity to share data with other Active X controls or extensions on the same computer or one on a remote computer system. Other ActiveX technologies such as ActiveX server pages and ActiveX server filters provide a comprehensive development system for Internet and Web browser based systems.

Browser/Server Models

In sum, HTTP is the basic underlying protocol for HTML, CGI script, Java applets and ActiveX controls. FIGS. 1-3 show the three basic Web servers and Web browser configurations. FIG. 1 shows an inactive model of a typical HTML-only based environment. Web server 10 provides HTML based Web pages to Web browser 20, the HTTP client. No animation or browser-controlled output is possible because neither CGI scripts, Java nor ActiveX is implemented.

FIG. 2 represents the active server model, and shows enhancements to the basic model of FIG. 1. In this model, Web server 30 is an active server, providing dynamic information on Web pages, HTML-based database access, and CGI-style programs. Web browser 40, the HTTP client, continues to be inactive and only display what is sent by the Active server, but now the Active server model offers programmable extensions to the server software that are similar to CGI scripts. These extensions execute in the same address space as the server software, and have access to all the server system resources, providing much faster response time than CGI programs.

FIG. 3 represents the next evolution, the ActiveX model. It shows additional communication between the Web server 50 and the Web browser 60 other than just HTML. In this model, ActiveX controls on the Web browser 60 communicate directly with ActiveX controls on the Web server 50. ActiveX controls are software objects or somewhat self-contained programs that can be contained within other programs called container objects 55. Internet Explorer 4.0 (a Web browser), Microsoft Office Binder and the present Windows shell are all examples of ActiveX container objects 55.

One example of an ActiveX control for the Web browser is Microsoft's ActiveMovie Control. ActiveMovie Player is an ActiveX control that can view files that contain both audio and image information. The key advantage is that you can produce streaming multimedia content that the user can immediately enjoy, rather than waiting for a multimedia file to be first downloaded. ActiveX technology provides for on the fly Web browser updating. If the Web browser does not initially support ActiveMovie, for example, the Web server will update the Web browser by sending the ActiveMovie component via HTTP. The Web browser will transparently install ActiveMovie and retain it for future use. The ActiveMovie component executes as part of the Web browser and extends its capabilities to play real-time sounds and images. While playing a movie, the communication is no longer HTML, but direct communications between the ActiveMovie ActiveX control on the Web server and the ActiveMovie ActiveX control on the Web browser. Hence, ActiveX controls are not limited to Web pages. They may be used as software objects within a standard non-networking application. Such reusability allows a program to be constructed as a stand alone non-networking application and then easily extended to share information with remote computer systems.

Object Oriented Programming

The second computer development that is not known to have been applied in the field of automotive service equipment is object oriented programming and object oriented design (OOP/OOD). OOP involves the creation of software "objects." The foregoing description of Internet technologies referred to such objects, because current Web browser/server technology relies heavily on them. More generally, however, software objects may be thought of as self-contained mini-programs within a program. Before OOP, programs primarily consisted of two basic elements, data and program instructions. Data elements are storage locations. Program instructions are commands the computer will follow to make decisions or manipulate data. A data element such as a variable, constant or structure had only one function—to hold information. Instructions had only one function—to perform some action. With the advent of software objects, the line between data and instructions becomes fuzzy. Objects are software entities that have properties. They can take action, like instructions, but also utilize data. One of the main virtues of software objects is their inherent reusability. Objects, being largely self-contained, may be purchased that perform many commonplace functions, such as database routines, mathematical algorithms, and input/output functions. Many objects are included with the Microsoft Visual C/C++ 4.2 Developers Studio, an integrated software development environment for writing object oriented programs.

Object oriented applications are generally easier to create and modify than non-object oriented applications. If a portion of an application must be changed, all that is necessary is to change the particular software object in question. The modification will be transparent to the rest of the application. This is in contrast to prior systems in which an entire application had to be rewritten and debugged whenever a minor change was made to a single part of the application.

Object oriented programs also do not have to reside completely on one computer. As long as the object can be accessed, the computer running the main application routine will be able to call the object and operate on it. A computer running a main application routine might use the HTTP protocol to retrieve an object from a computer having a known TCP/IP address. In sum, OOP allows the transition from monolithic closed systems to distributed open systems.

SUMMARY OF THE DISCLOSURE

In accordance with one aspect of the disclosure, a method for conducting a vehicle diagnostic analysis comprises the machine-implemented steps of executing a software application for conducting the vehicle diagnostic analysis, receiving signals representative of parameters of a vehicle, accessing a software object over a data transmission network, the software object containing information necessary for conducting the vehicle diagnostic analysis, and determining a vehicle diagnostic state based on the signals representative of the parameters of the vehicle and the information contained in the software object.

In one aspect, the method further comprises the step of displaying the vehicle diagnostic state. In another aspect, the method includes calculating a usage fee based on the number of times the software object is accessed.

Since the information necessary for conducting the vehicle diagnostic analysis is distributed in different systems connecting to each other with a data communication network, a local automotive service system can minimize the size of software stored locally and can access most of the information and/or algorithm required to conduct the vehicle diagnostic analysis from a remote system. In addition, updates of the information can take place seamlessly without affecting the local system. The remote system that allows information access by other systems can calculate usage charge based on a per-use basis.

Additional advantages and novel features of the disclosure will be set forth in part in the description with follows, and in part will become apparent to those skilled in the art upon examination of the disclosure presented herein.

BRIEF DESCRIPTION OF THE DRAWINGS

FIGS. 4-6 show schematic block diagrams of various embodiments of the disclosure.

DETAILED DESCRIPTION OF ILLUSTRATIVE EMBODIMENTS

Figure 1:
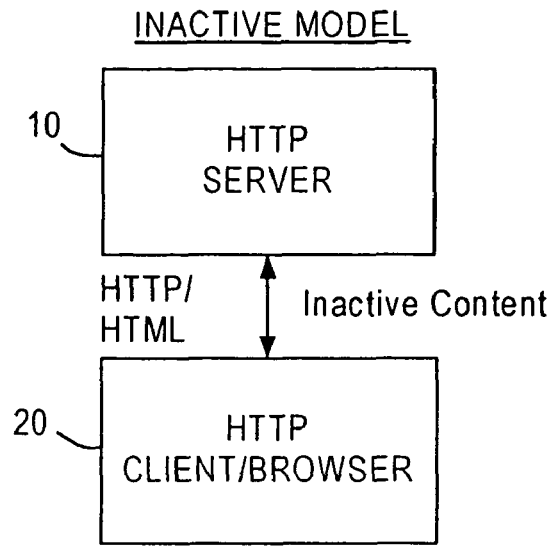
FIGS. 1-3 show block diagram overviews of Internet browser/server configurations.
Figure 2:
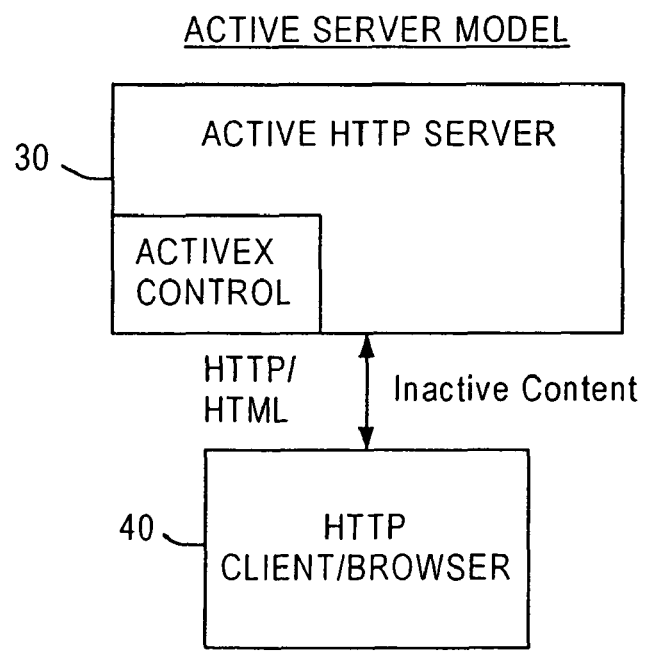
Figure 3:
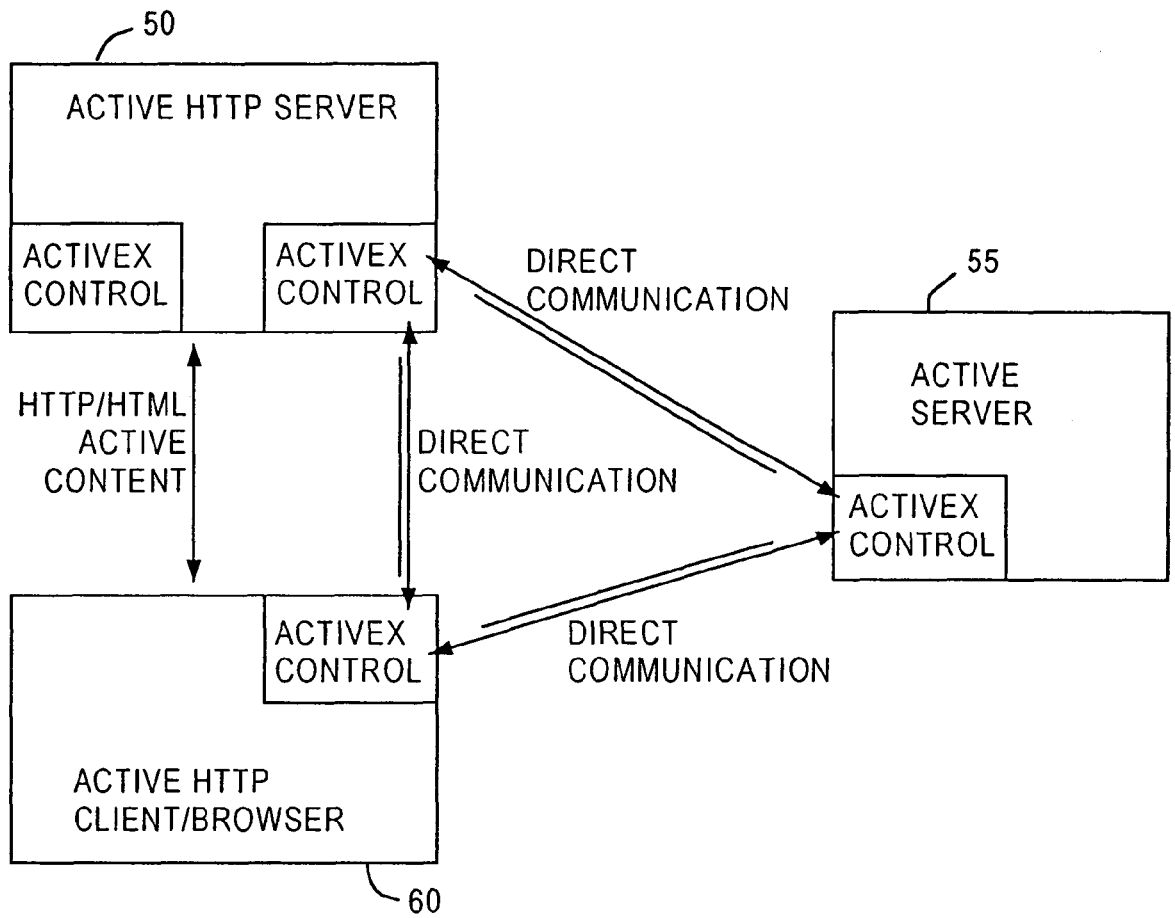
Figure 4:
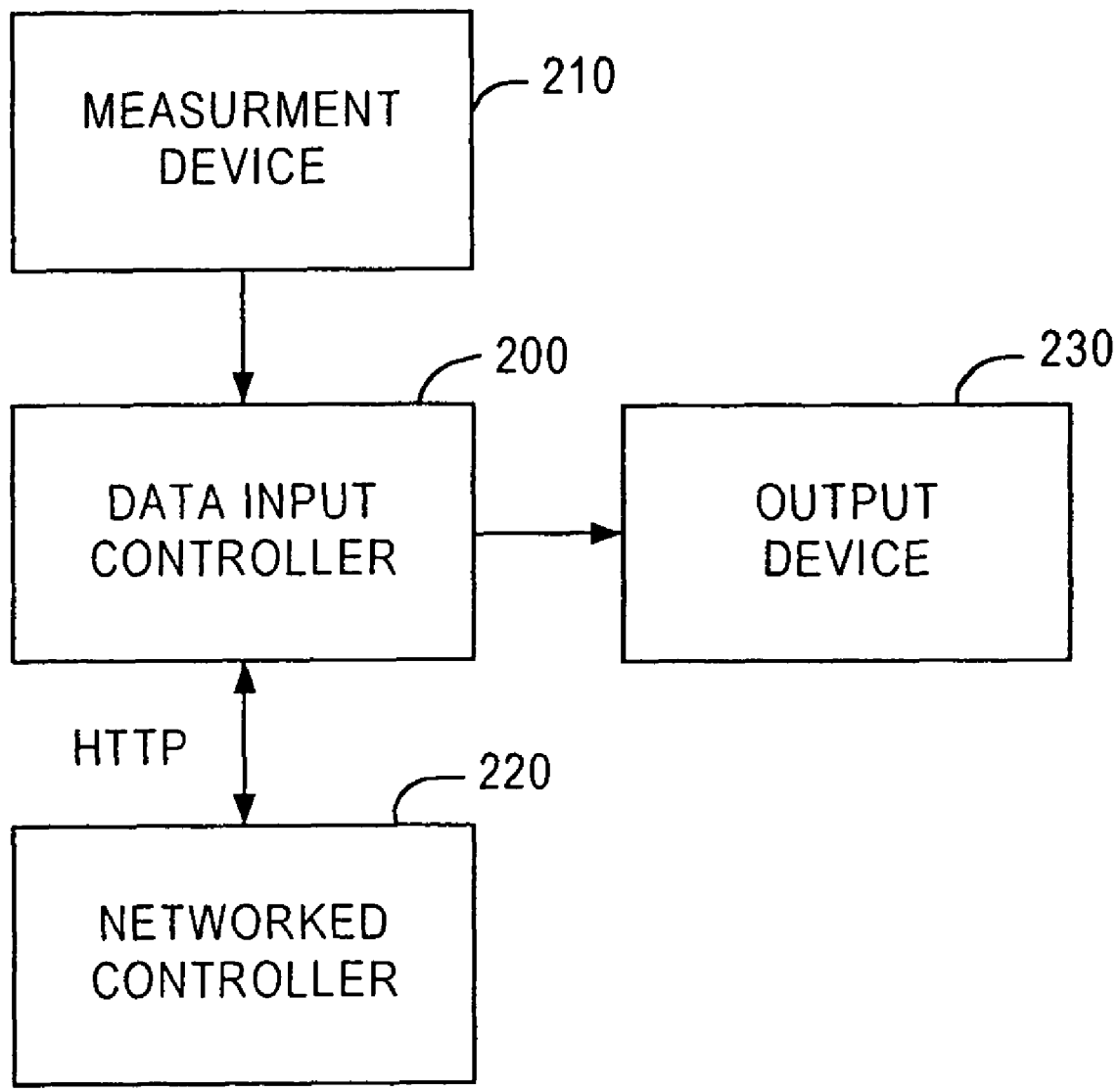

FIG. 4 shows a block diagram of an exemplary automotive service equipment system according to the disclosure. The system of FIG. 4 is used to conduct a diagnostic analysis of vehicle components, such as the engine, brakes, suspension or alignment. While FIG. 4 shows an exemplary automotive service system in its general form, the description herein will, by way of example, occasionally describe the operation of an exemplary vehicle wheel aligner, such as that disclosed in U.S. Pat. Nos. 4,383,370 or 5,208,646, implementing various features according to this disclosure.

Data input controller 200 is a computer, which may contain a microprocessor and a memory coupled thereto (not shown). Controller 200 comprises a general purpose portable computer (PC), such as an Intel Pentium-based IBM compatible computer, although any hardware platform suitably programmed will work just as well. Data input controller 200 receives data input from a measurement device 210. In a wheel alignment application, measurement device 210 may be one or more wheel mounted alignment angle sensors. Measurement device 210 is adapted to transmit signals representative of a vehicle diagnostic state to data input controller 200. Such information can be transmitted via a hard wired cable and a serial connection, via infrared transmission and a serial connection, via radio frequency transmission and a serial connection, or any other known means. In the vehicle wheel aligner example, such information can be transmitted via cables directly linking each alignment sensor head to the wheel alignment controller 200.

Data input controller 200 is adapted to receive the input from measurement device 210 and to create an output perceptible by an operator at an output device 230. Output device 230 will usually be a CRT coupled to the data input controller 200 through appropriate video driver means as is known in the art. Nonetheless, the output device might also include an audio output, such as a series of coded tones signifying various vehicle diagnostic states, or even voice guided alignment, as disclosed in copending application Ser. No. 08/920,029, assigned to the present assignee herein, and incorporated by reference. In the vehicle wheel aligner embodiment, the output device 230 comprises a CRT that contains a graphic display of a vehicle diagnostic state, for instance real-time readings for wheel alignment angles, such as toe, camber, caster, SAI, et cetera. Juxtaposed with the graphic real-time readings are graphic representations of vehicle wheel alignment specification values, such that an operator of the vehicle wheel alignment system is easily capable of comparing present real-time readings with the desired specification values and in response making appropriate servicing adjustments.

While data input controller 200 accepts data from measurement device 210, and places vehicle diagnostic information on output device 230, controller 200 does not necessarily comprise all of the computer software necessary to perform the vehicle diagnostic computations. Therefore, networked controller 220 is provided. Networked controller 220 itself comprises a computer having a microprocessor and a memory. At least some of the computer software necessary for controller 200 to create a suitable output at output device 230 resides in the memory of networked controller 220. Between data input controller 200 and networked controller 220 is provided a suitable computer network. The suitable computer network makes it possible to place networked controller 220 at a location remote from data input controller 200. However, it is not necessary for networked controller 220 to be remote. Controllers 200 and 220 may be located as close as the same room, as long as the proper connections and protocols are observed.

The network connection between data input controller 200 and networked controller 220 generally comprises the HTTP network protocol, or any protocol substantially similar. Since HTTP, or its substantial equivalent, is used, controller 200 may communicate with controller 220 via hypertext markup language (HTML). In this regard, data input controller 200 is similar to a Web browser, and networked controller 220 is similar to a Web server. At the Web server, oftentimes an application exists that receives data inputs from a Web browser, and then uses those inputs to dynamically assemble a particular output in return. The Web browser then displays the output to the browser operator. These applications are generally referred to as common gateway interfaces (CGI). A CGI script file is a program that executes on the Web server. A database search engine is a good example of a CGI script, as is a Web page counter that indicates the number of "hits," or visitors, to a Web page within a certain period. The user at the Browser is first presented with a form inquiring what type of information is to be extracted from the database. Once the user fills out the form and submits it by sending it back to the Web server, the CGI script is executed. The CGI uses the information from the form to compose a query to the database. The CGI script then formats the information retrieved from the database query and sends it back to the Web browser for display. In one embodiment, networked controller 220 comprises a Web server having ActiveX server technologies. Similarly, data input controller 200 comprises a Web browser having ActiveX controls.

The system can be implemented via an Internet connection or any suitable local area network connection. One of skill will appreciate that, when networked to each other, controller 200 and controller 220 each have unique network addresses. The unique network addresses for controller 200 and controller 220 may comprise TCP/IP addresses. Indeed, data input controller 200 is capable of accessing multiple networked controllers that, like controller 220, are each addressable and utilize the HTTP protocol. Each different network controller is capable of providing functionality for a different item of automotive service equipment. One networked controller may comprise ActiveX functionality for a vehicle wheel alignment system, while another networked controller may comprise ActiveX functionality for an engine analyzer. In any event, data input controller 200 may access either or both of them, and measurement device 210 will then be interchanged appropriately to supply the proper sensor equipment for the particular task at hand. For instance, when networked controller 220 comprises the ActiveX technologies sufficient to provide wheel alignment functionality to data input controller 200, measurement device 210 comprises wheel alignment sensor heads. When networked controller 220 comprises the ActiveX technologies sufficient to provide engine analyzer functionality to data input controller 200, measurement device 210 comprises engine analysis test probes. In light of the foregoing, data input controller 200 may host more than one integrated system of automotive service equipment.

In operation, the microprocessor (not shown) of data input controller 200 executes an application residing in controller 200 memory that allows it to access the memory of the networked controller 220 through the controller 220 microprocessor. In one embodiment, data input controller 200 accesses the memory and microprocessor in networked controller 220 to access a software object representative of vehicle diagnostic specifications, such as vehicle wheel alignment specifications. In this case, once data input controller 200 retrieves such information, data input controller 200 can use software routines that reside in its own memory to convert the signals that represent the vehicle diagnostic state into an output at the output device for the operator to review. This is one example of distributed computing using software objects.

In another embodiment, data input controller 200 accesses the memory and microprocessor in networked controller 220 to access a software object representative of both vehicle diagnostic specifications and the diagnostic algorithm itself. In this embodiment, the signals that represent the vehicle diagnostic state are passed to the networked controller 220 memory. There, the networked controller 220 microprocessor performs the algorithms necessary to convert the raw data signals originating in measurement device 210 into processed signals. The processed signals are indicative of the result of a vehicle diagnostic computation. The processed signals are then returned over the network to data input controller 200 memory, where the processed signals are directly used to form the output that will appear at output device 230. This is another example of distributed programming.

Figure 5:
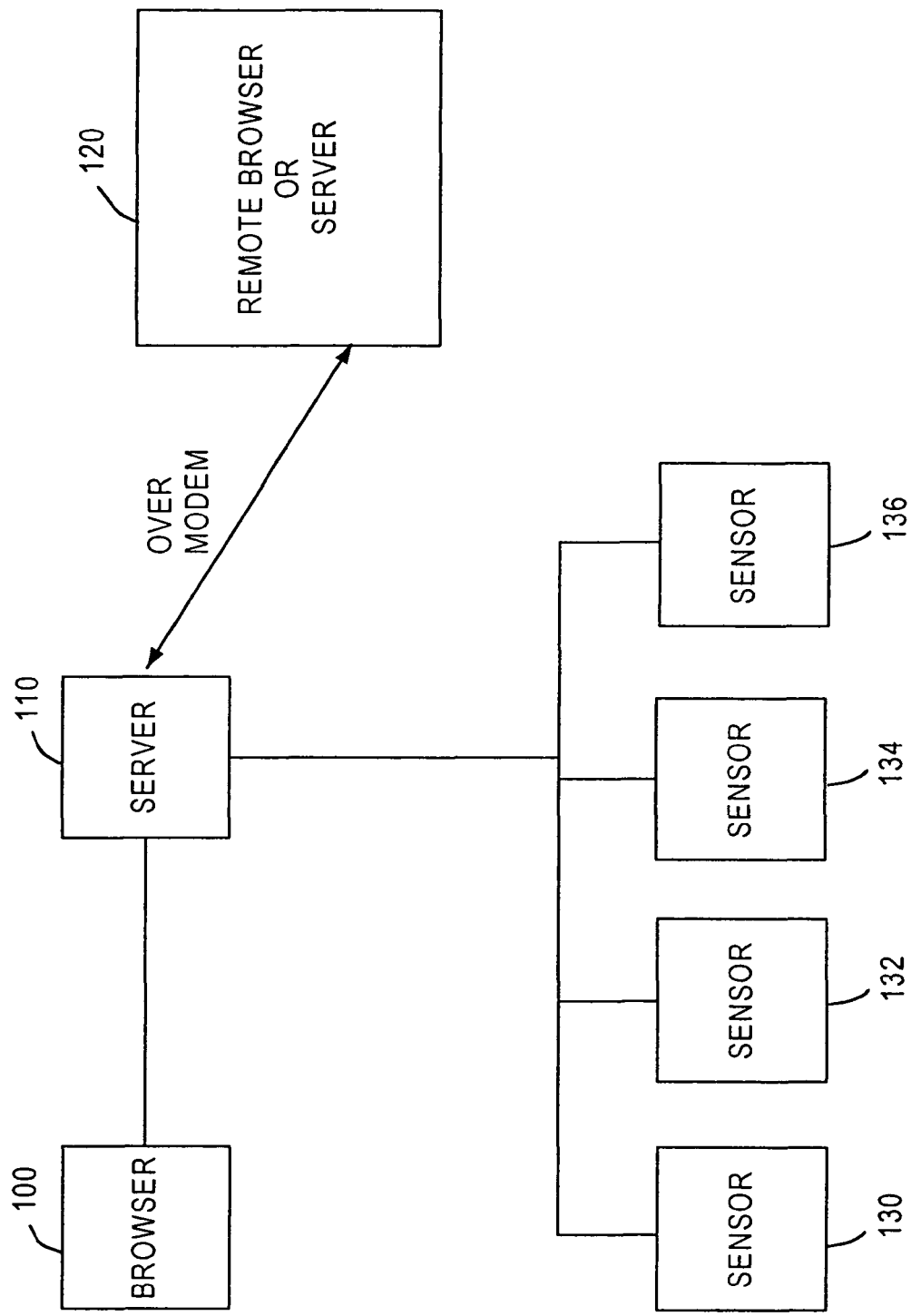

FIG. 5 is a schematic block diagram showing another embodiment. Here, data input controller 200 and output device 230 have been partly combined into the functionality represented by browser 100, consistent with what was just described. Network controller 220 has been partly combined into the functionality represented by server 110, consistent with what was just described. Similarly, wheel alignment sensors 130, 132, 134 and 136 are species of measurement device 210. However, unlike the embodiment shown in FIG. 4, in this embodiment sensors 130, 132, 134 and 136 are coupled to server 110 through appropriate network connections. This is in contrast to the equivalent structure in FIG. 4 being coupled to the data input controller.

In the embodiment of FIG. 5, server 110 is an active server, such as one with DCOM technologies, for example, ActiveX technologies. Server 110 has an area, or set of pages, dedicated to general customer data, vehicle type and vehicle diagnostic information. Another area is dedicated specifically to alignment procedures. In operation, browser 100 hosts ActiveX controls for functions requiring interaction or dynamic content, such as alignment meters for graphical display to an operator. Browser 100 may host a Java Virtual Machine that is adapted to accept Java byte codes from server 110, and thereby provide computer animation on the browser 100 display using Java applets. These applets might comprise operator instructional information, and similar help files. In one aspect, the sensors 130, 132, 134 and 136 communicate on a TCP/IP based shop network (Intranet) or are directly connected to the server 110 through a standard dedicated interface such as a serial communication port. Data from the alignment sensors is transmitted to server 110 via direct communication between ActiveX controls on the server and in the sensor subsystems. The ActiveX controls in server 110 processes the data through alignment algorithms that send the processed data to the ActiveX meters in browser 100 for display. It will be appreciated that the ActiveX controls are software objects constructed with OOP techniques and can be designed for reuse in other applications.

The system of FIG. 5 also supports a remote browser or server 120. Remote browser or server 120 is addressed over the Internet and has its own Internet TCP/IP address. Server 110 may comprise a modem to allow remote connection to remote browser or server 120 over a telephone line, for instance via a standard Internet service provider (ISP) connection. In this way, a Web browser or server 120 anywhere in the world can access the aligner system of FIG. 5. Remote browser or server 120 can even take the place of the functionality provided by on-site browser 100. In other words, the alignment readings can be displayed on meters from within the remote Web browser or server 120. All of the foregoing connections, in the embodiment, are carried out using the HTTP transmission protocol. In addition, while server 110 and remote browser or server 120 have been described as carrying ActiveX technologies, it is easily apparent to those of skill in the art that the systems can be modified to incorporate a thin client, CGI and/or Java to perform the various network and data intensive tasks. It is equally apparent that any time a browser function is recited above, the same end result can be accomplished using a thin client instead.

FIG. 6 is a schematic block diagram representation of another embodiment. Notably, the system of FIG. 6 allows up to the minute retrieval of information in an automotive service equipment system. This up to the minute information can include vehicle diagnostic specifications, such as vehicle wheel alignment specifications for new models, and corrected values for old models when errors in an existing database are corrected. In addition to up to the minute information retrieval, the system of FIG. 6 enables remote billing options that heretofore were not possible. Wheel alignment, engine analysis, brake testing, wheel balancing and the like can all be performed in a shop environment on a "pay-per-use" basis, wherein a remote server permits the use of vehicle diagnostic software, and keeps account of the number of times such software is used by a particular shop.

Service equipment 190, i.e. all computer based components within a garage or service bay that use or generate information, is connected as an HTTP network at the local shop. For instance, the service equipment 190 may include a shop management system 192 that keeps track of jobs, scheduling and customer information; an alignment system 194; an engine diagnostic system 196 and a show room kiosk 198 that enables car owners to access current data about their car, such as to view the alignment procedure as it occurs in the service bay itself. The enumeration of these types of service equipment is not to be construed as limiting but rather exemplary, as there are many dozens of types of service equipment in use in a typical garage that might be incorporated into the shop-wide network. Each individual item of service equipment 190 carries a unique TCP/IP address and is located on the local shop HTTP network, along with a local shop server 170, which acts as a gateway to the outside world. Server 170 also acts as the common repository of information.

Utilizing a modem on the local server 170, the network can be attached to the Internet via an ISP. It is then possible to retrieve information from a number of sources such as an equipment provider, automotive manufacturer or the home office of a chain of garages. Information need not be restricted to automotive information. The network also supports accessing such business information as inventory levels at sister stores, transmission of email to customers, or remote diagnosis of shop floor equipment by automotive service equipment manufacturers. For example, in FIG. 6, server 150 is an automotive service equipment manufacturer server that can diagnose equipment problems in alignment system 194; server 160 is a server for an OEM automobile manufacturer server that can provide new or updated vehicle servicing specifications; server 180 is a service station owner/parent company server that can retrieve and supply business information, such as inventory, delivery, service quota and other information.

In one aspect, the service equipment applications for service equipment 190 are written using Microsoft Developer Studio and ActiveX technologies. This is because the ActiveX programmer is not required to know the details of communicating information over the network to write an application. The sharing of information is accomplished within the computer operating system software (such as Windows), not the application software written by the programmer. This way, applications can be written as a stand alone program, and then later connected to the HTTP network when it is desired to share information, with few or no modifications to the underlying program. Each of the servers may also utilize Java or CGI scripts as appropriate to carry out specific functions that are best handled by those kinds of tools. For example, Java conveniently supports animation. CGI supports form-based database searching.

Although the illustrative embodiments has been shown and described, those skilled in the art will recognize, or be able to ascertain using no more than routine experimentation, many equivalents to the specific embodiments specifically described herein. Such equivalents are intended to be encompassed in the scope of the following claims.

What is claimed is:

1. In an automotive wheel alignment system linked to a data transmission network, a host computer of the wheel alignment system configured to service a vehicle and transfer data over the data transmission network and for storing a first plurality of vehicle wheel alignment data sets, and a computer remote from the wheel alignment system configured to transfer data over the data transmission network and for storing a second plurality of vehicle wheel alignment data sets, an improvement comprising:

the host computer further configured to generate a request for at least one specific vehicle wheel alignment data set from the remote computer;

the remote computer configured as a web server to respond to the request from the host computer to dynamically generate at least one customized web page containing the at least one specific vehicle wheel alignment data set from the second plurality of vehicle wheel alignment data sets for transfer to the host computer over the data transmission network; and wherein the host computer is further configured to incorporate the at least one specific vehicle wheel alignment data set into the first plurality of vehicle wheel alignment data sets for use with subsequent vehicle wheel alignment procedure.

2. The improved automotive wheel alignment system of claim 1, further comprising:

at least one sensing device for obtaining vehicle wheel alignment parameters, wherein the host computer is further configured to receive signals representing the vehicle wheel alignment parameters from the at least one sensing device and to process the received signals based on the at least one specific vehicle wheel alignment data set.

3. The improved automotive wheel alignment system of claim 2, wherein the at least one specific wheel alignment data set includes vehicle specifications.

4. The improved automotive wheel alignment system of claim 1, wherein the at least one specific vehicle wheel alignment data set is an updated version of an original vehicle data set included in the first plurality of vehicle wheel alignment data sets.

* * * * *